(12) United States Patent
Endo

(10) Patent No.: US 7,492,423 B2
(45) Date of Patent: Feb. 17, 2009

(54) LIGHTING APPARATUS FOR LIQUID CRYSTAL DISPLAY

(75) Inventor: Ken Endo, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 617 days.

(21) Appl. No.: 11/208,526

(22) Filed: Aug. 23, 2005

(65) Prior Publication Data
US 2006/0061695 A1 Mar. 23, 2006

(30) Foreign Application Priority Data
Aug. 24, 2004 (JP) ............................. 2004-243252

(51) Int. Cl.
*G02F 1/1335* (2006.01)
(52) U.S. Cl. ............................. 349/61; 349/62; 349/65
(58) Field of Classification Search .............. 349/61–62
See application file for complete search history.

(56) References Cited

U.S. PATENT DOCUMENTS

| | | | |
|---|---|---|---|
| 5,121,232 A | 6/1992 | Miyadera | |
| 6,519,019 B2 | 2/2003 | Yazawa | |
| 6,717,565 B1 | 4/2004 | Kurosawa et al. | |
| 6,940,569 B2 * | 9/2005 | Tanaka et al. | ................ 349/58 |
| 2005/0219834 A1 | 10/2005 | Kakiuchi | |

FOREIGN PATENT DOCUMENTS

JP 2000-1 6 2 5 7 6 6/2000

OTHER PUBLICATIONS

English language Abstract of JP 2000-162576.

* cited by examiner

*Primary Examiner*—David Nelms
*Assistant Examiner*—Phu Vu
(74) *Attorney, Agent, or Firm*—Greenblum & Bernstein, P.L.C.

(57) ABSTRACT

A lighting apparatus for an LCD (liquid crystal display) is provided to a body of a predetermined device. The lighting apparatus includes a transmissive LCD configured to be movable with respect to the body between a retracted position and a protruded position. An outer surface of the LCD is substantially in a same plane of a surface of the body on which the LCD is provided when the LCD is located at the retracted position. The outer surface of the LCD is protruded from the plane of the body when the LCD is located at the protruded position. An open space is formed on an inner side of the LCD. And at least one light source configured to emit light toward the open space to illuminate the LCD located at the protruded position from a rear side thereof is provided.

9 Claims, 10 Drawing Sheets

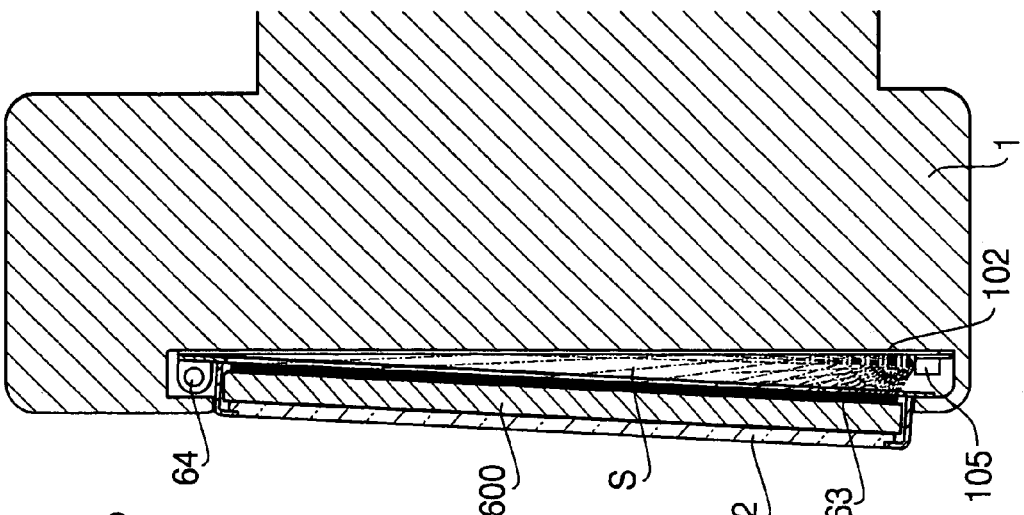
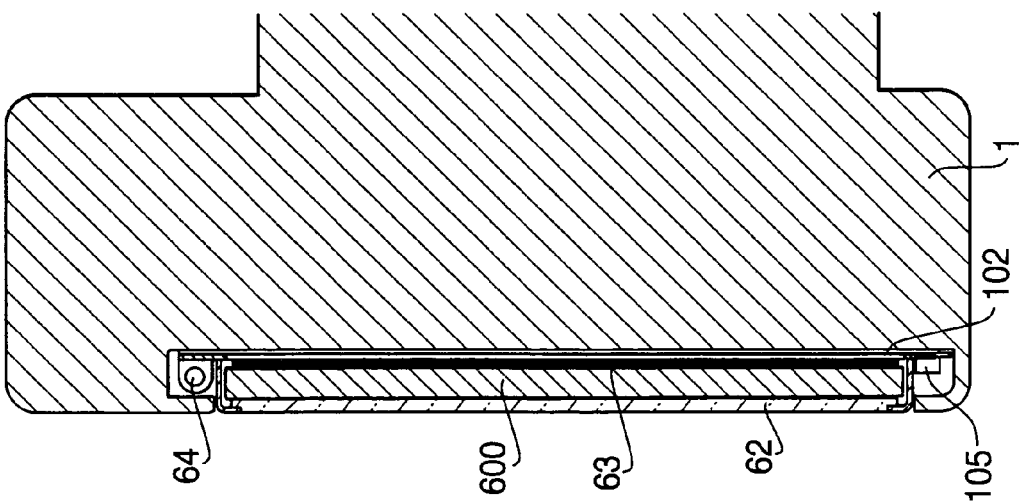

LIGHTING APPARATUS FOR LIQUID CRYSTAL DISPLAY

BACKGROUND OF THE INVENTION

The present invention relates to a lighting apparatus for an LCD (liquid crystal display), and particularly to a lighting apparatus for an LCD of a digital camera.

A digital camera is generally provided with an LCD allowing a user to monitor captured images. Generally, there are two types of LCDs: a reflective type LCD; and a transmissive type LCD. The reflective type LCD is widely used as a display device in various devices such as a cellular phone and personal digital assistant (PDA). The LCD of this type requires, however, a device for illuminating an image displaying surface. Therefore, the reflective type LCD tends to be large in size. In addition, the color saturation of the reflective type LCD is relatively low. Such reflective liquid crystal may be adaptable, for example, for a cellular phone, wherein no specifically high image quality is required, but the reflective liquid crystal may not be suitable for a display configured in a digital camera wherein relatively high image quality is required. If the reflective liquid crystal is possibly used for a display in a digital camera, a light guide is required to be overlaid on the surface of the LCD whereto the emitted beams are introduced, as described in Japanese Provisional Patent Publication No. 2000-162576. In this case, the camera body inevitably increases the dimension in depth. For the purpose of downsizing, the light guide needs to be configured thinner, although the beams through a thinner light guide may not reach to the periphery of the display area, or may not be provided evenly with enough brightness.

Thus, it is difficult to use the reflective type LCD in the digital camera which requires, in many cases, a transmissive type LCD, and it is equipped with back lights for clearer images to be seen. The LCD of the digital camera is typically arranged on the back surface of the camera body. An example of a configuration of back lights is disclosed in Japanese Patent Provisional Publication No. 2000-162576. According to JP Provisional Publication No. 2000-162576, the liquid crystal is provided with light sources and a light guide. The beams emitted from the light sources or other available light are guided to illuminate the LCD from the rear side of the LCD.

With this structure, thus, the dimension of the LCD with a light guide is increased in depth, which results in, as shown in FIG. 12 of Japanese Patent Provisional Publication No. 2000-162576, the LCD protrudes outward of the camera body, and may cause a difficulty in configuring a slim and downsized camera.

SUMMARY OF THE INVENTION

The present invention is advantageous in that a lighting apparatus for an LCD is provided, wherein the apparatus is adapted to illuminate a transmissive or reflective LCD, and is downsized in depth by having substantially no light guide.

According to an aspect of the present invention, a display device is provided to a body of a predetermined device. The display device includes a transmissive LCD configured to be movable with respect to the body between a retracted position and a protruded position. An outer surface of the LCD is substantially in a same plane of a surface of the body on which the LCD is provided when the LCD is located at the retracted position. The outer surface of the LCD is protruded from the plane of the body when the LCD is located at the protruded position. An open space is formed on an inner side of the LCD. And at least one light source configured to emit light toward the open space to illuminate the LCD located at the protruded position from a rear side thereof is provided.

Optionally, the LCD may be rotatably supported at one side end thereof, so that an opposite end portion of the LCD may be protrusible outward from the device body, and the at least one light source may be provided at an edge corresponding to opposite end portion of the LCD. Alternatively, the entirety of the LCD may be configured to protrude outward from the device body, and the light sources that may include a plurality of light sources may be arranged along two edges corresponding to the sides of the LCD that are parallel to each other. Optionally, a reflector that may reflect beams may be provided on a surface of the device body facing to the rear side of the LCD, and a diffuser to diffuse beams on the rear side of the LCD.

According to another aspect of the present invention, there is provided a display device to a body of a predetermined device. The display device includes a reflective LCD, and a transparent plate member, which is arranged in front of the LCD. The plate member is configured to be movable with respect to the LCD between a retracted position and a protruded position. An outer surface of the plate member is substantially in a same plane of a surface of the body on which the LCD is provided when the plate member is located at the retracted position. The outer surface of the plate member is protruded from the plane of the body when the plate member is located at the protruded position. An open space is formed on an inner side of the plate member. And at least one light source is configured to emit light toward the open space to illuminate the LCD, when the plate member is located at the protruded position from the front side thereof.

Optionally, the plate member may be rotatably supported at one side end thereof so that an opposite end portion of the plate member is protrusible outward from the device body. In addition, the at least one light source may be provided at an edge corresponding to the opposite end portion of the plate member.

Optionally, a switching system that may switch electric power supply to the at least one light source may be provided so that the light source may be turned on when the LCD or the plate member may be in the protruded position and turned off when the LCD or the plate member may be in the retracted position. Optionally, a latching system that may latch the LCD or the plate member in a retracted position in the device body and release the LCD or the plate member in a manual operation may also be provided. Further, a bias member that may allow the LCD or the plate member to expand outward from the body may be provided.

BRIEF DESCRIPTION OF THE ACCOMPANYING DRAWINGS

FIGS. 4A and 4B show cross-sectional views of the LCD in a retracted position and in the protruded position in accordance with the first exemplary embodiment of this invention.

Figures 5A, 5B, 5C:
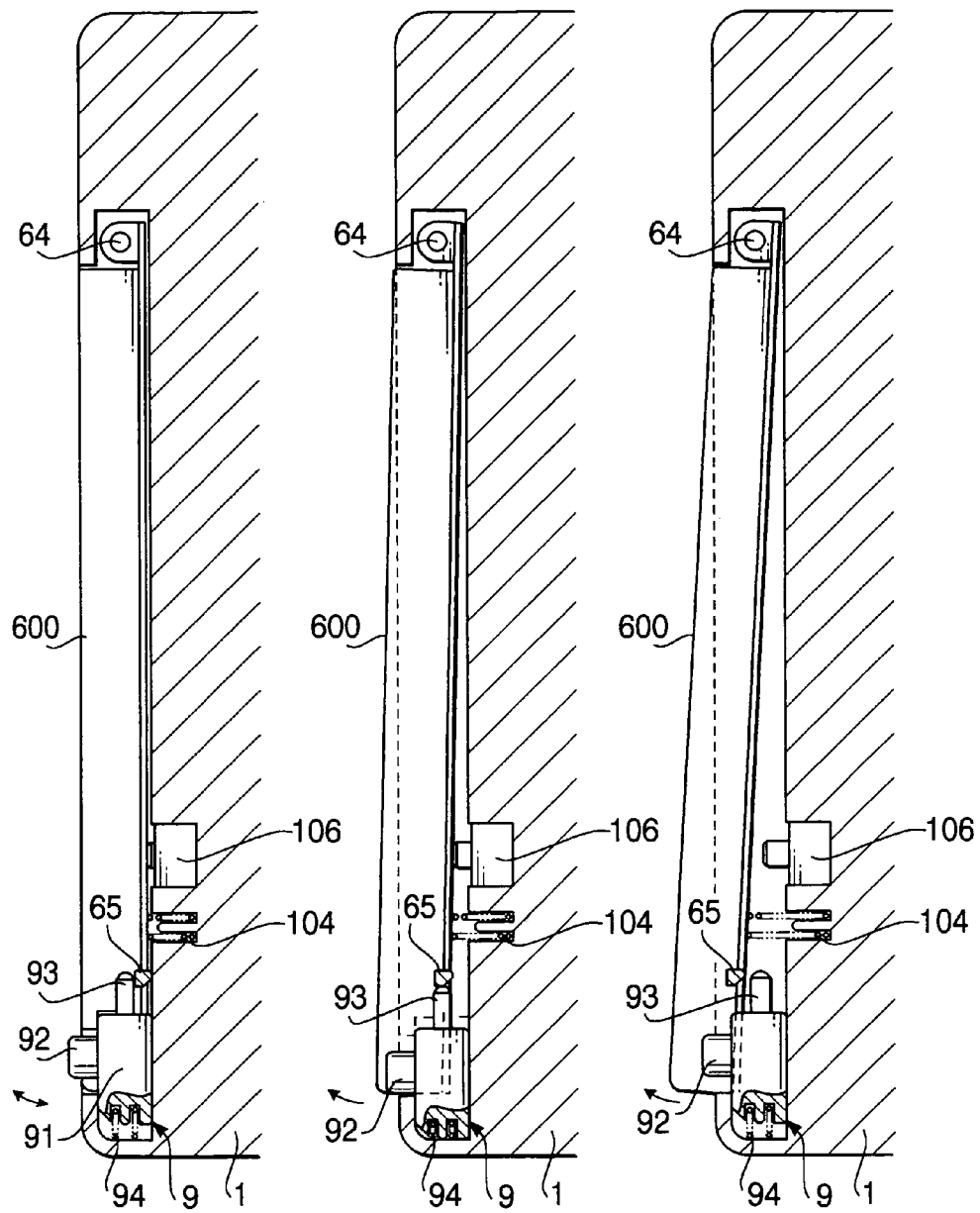

FIGS. 5A, 5B, and 5C show cross-sectional views of the display device with a mechanism of a lever to latch and release the LCD in accordance with the first exemplary embodiment of this invention.

Figure 6:
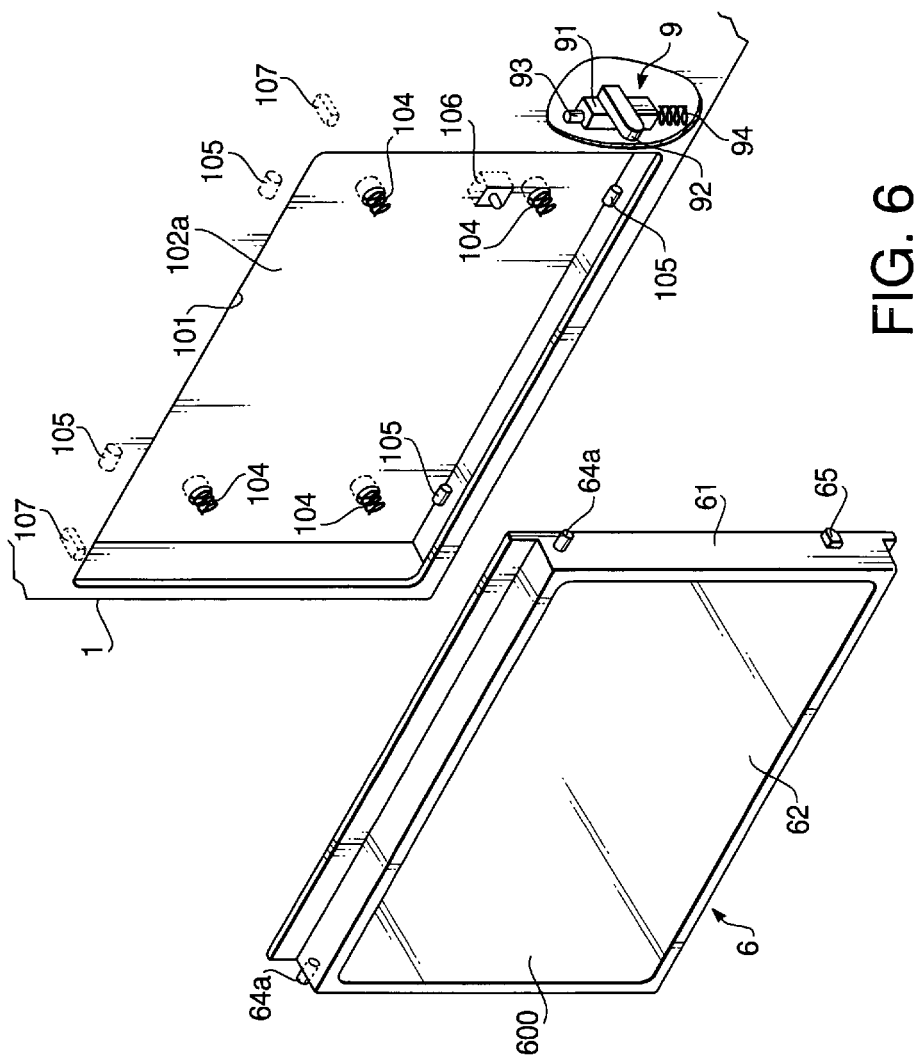

FIG. 6 shows a partially disassemblied view of a section that is related to a display device in accordance with the second exemplary embodiment of this invention.

Figure 7A:
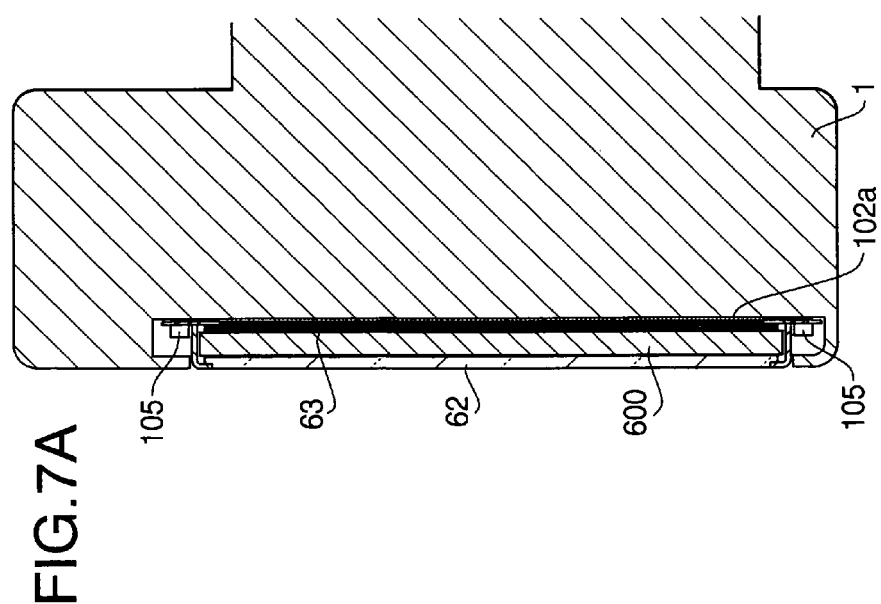
Figure 7B:
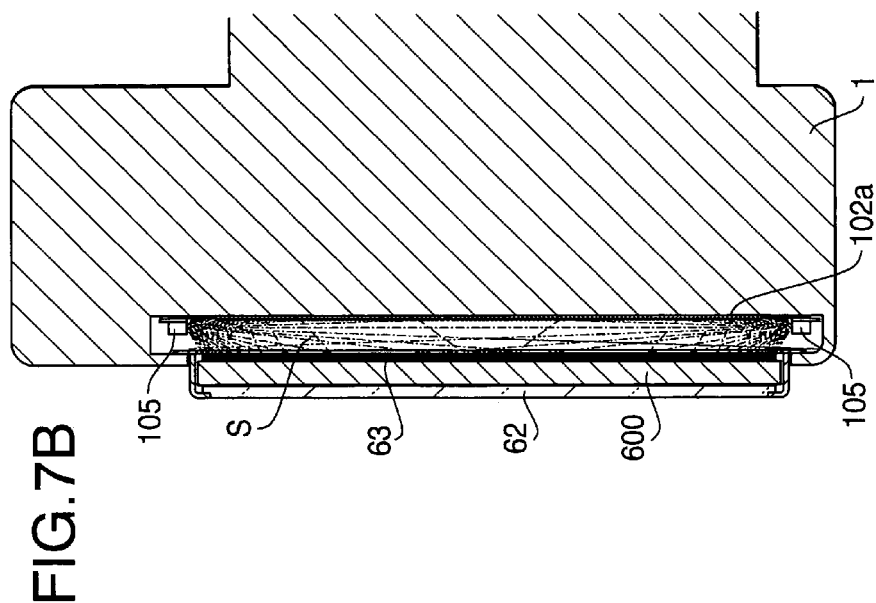

FIGS. 7A and 7B show cross-sectional views of an LCD in a retracted position and in a protruded position in accordance with the second exemplary embodiment of this invention.

Figure 8:
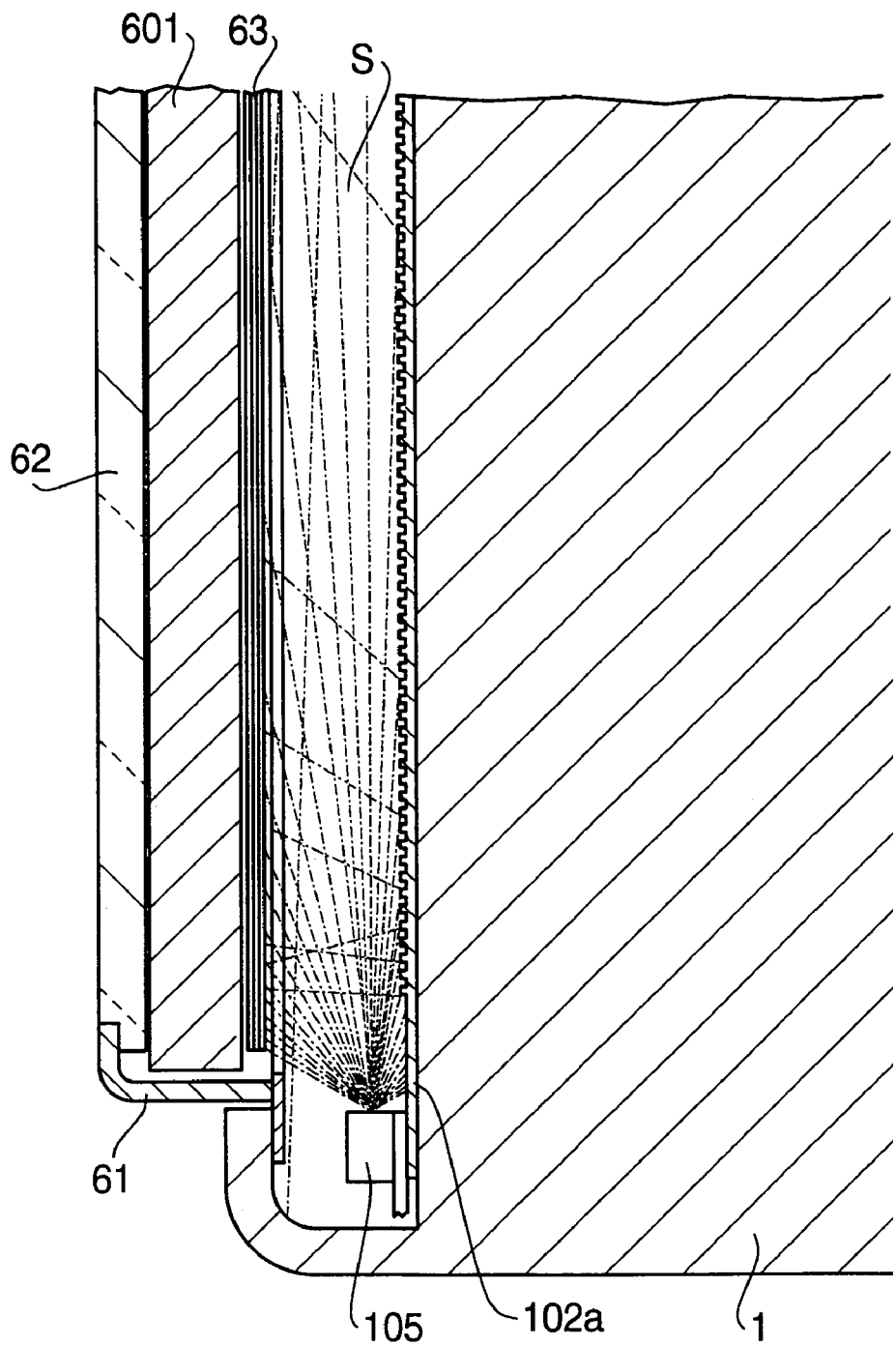

FIG. 8 shows an enlarged cross-sectional view of the display device, when the LCD is in the protruded position in parallel to the surface of the body in accordance with the second exemplary embodiment of this invention.

Figure 9:
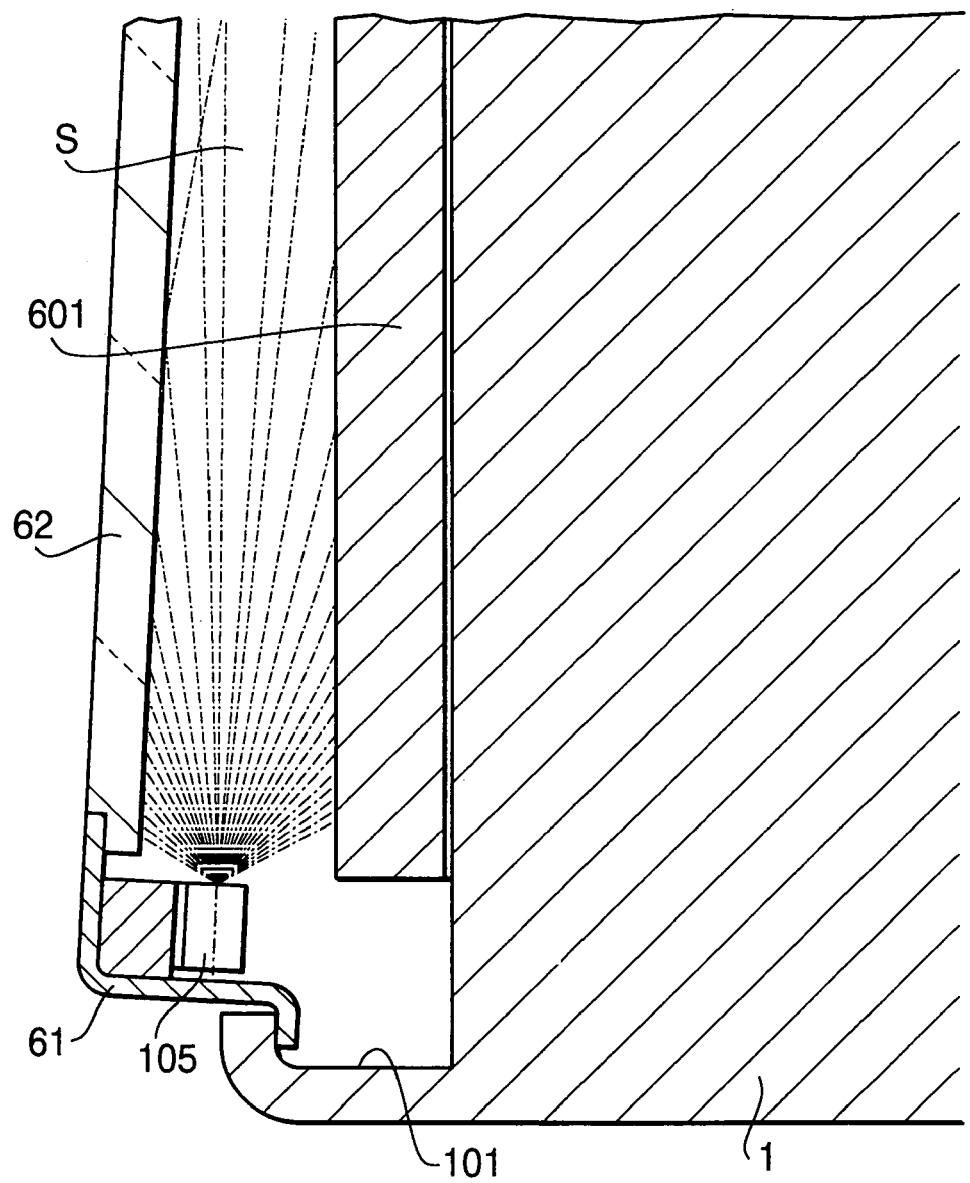

FIG. 9 shows an enlarged cross-sectional view of a display device, when an LCD is in a protruded position in accordance with the third exemplary embodiment of this invention.

Figure 10A:
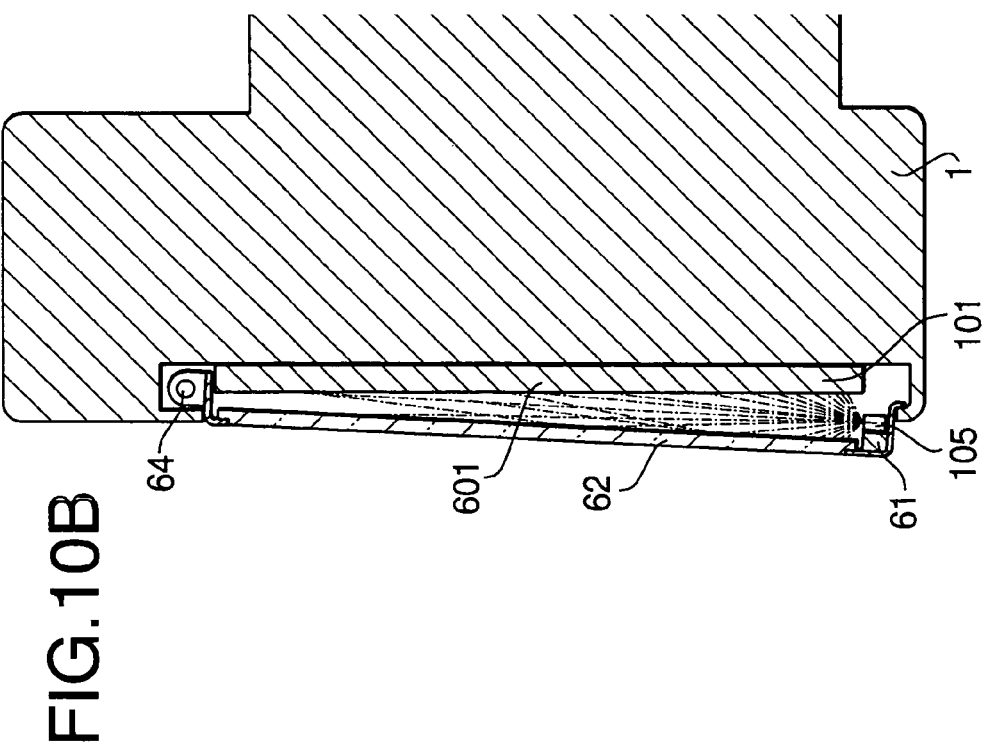
Figure 10B:
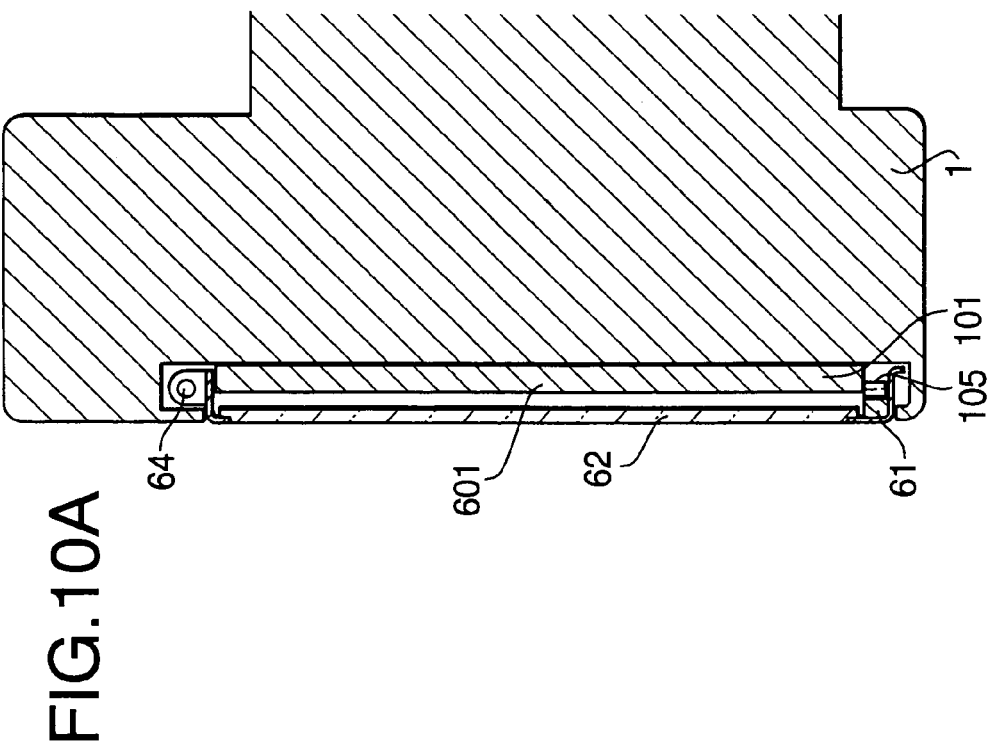

FIGS. 10A and 10B show cross-sectional views of the LCD in an retracted position and in the protruded position in accordance with the third exemplary embodiment of this invention.

DETAILED DESCRIPTION OF THE EMBODIMENT

Referring to the accompanying drawings, first, second, and third embodiments of the present invention will be described.

First Embodiment

Figure 1A:
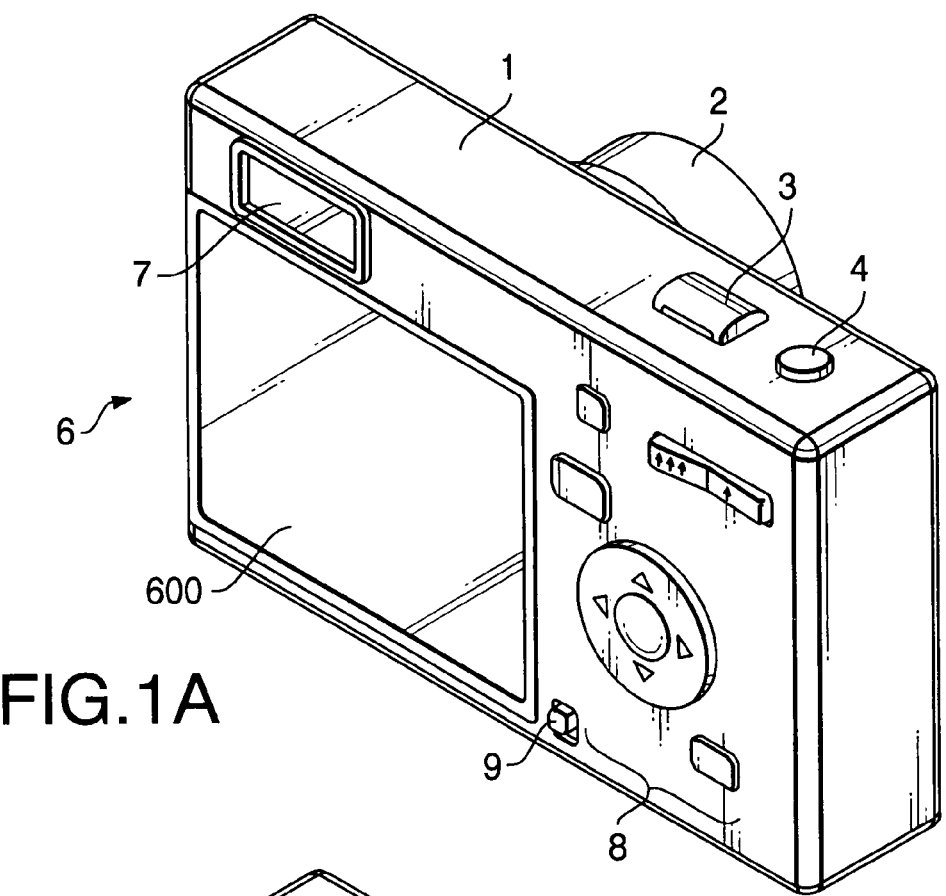
FIGS. 1A and 1B show external views of a digital camera employing a display device in accordance with an exemplary embodiment of this invention.
Figure 1B:
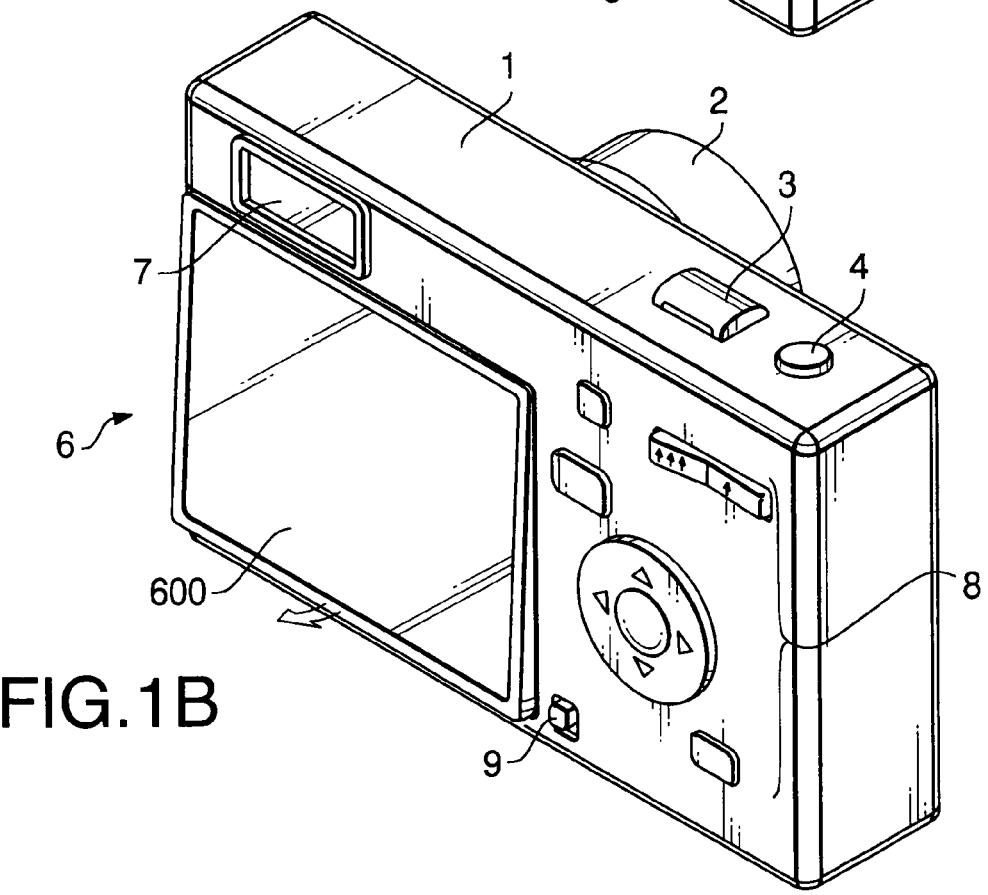

FIGS. 1A and 1B show external views of a compact digital camera employing a display device in accordance with an exemplary embodiment of this invention. As found in FIG. 1A, there are provided an objective lens 2 on one surface of the camera body 1, a release button 3 and a power switch 4 on the top surface. In addition, a display 6 including a transmissive LCD 600, an optical finder 7, and a plurality of operation buttons 8 on the other surface are provided. The display 6 is adapted to display various images, such as an image of an object to be shot, images that have already been shot, and configuration menu for program setting, which are switched from one to another by manual operations with the operation buttons 8. In the present and the following embodiments, the direction whereto the display 6 is facing is referred to as front.

In a transmittive LCD 600, an image is illuminated from the rear side of the liquid crystal with a lighting apparatus, and displayed with the light transmitted through the liquid crystal. The LCD 600 is configured as that the lower part of the LCD 600 can be protruded outward supported by the upper side thereof. As shown in FIG. 1B, in order for the lower part of the LCD 600 to be protruded from the plane of the body 1 to the position shown in FIG. 1B (in a protruded position), a lever 9 is pressed downward. Further, the LCD 600 is configured to be placed back in the body 1 to the plane surface by being pressed at the lower part, as shown in FIG. 1A (in a retracted position).

Figure 2:
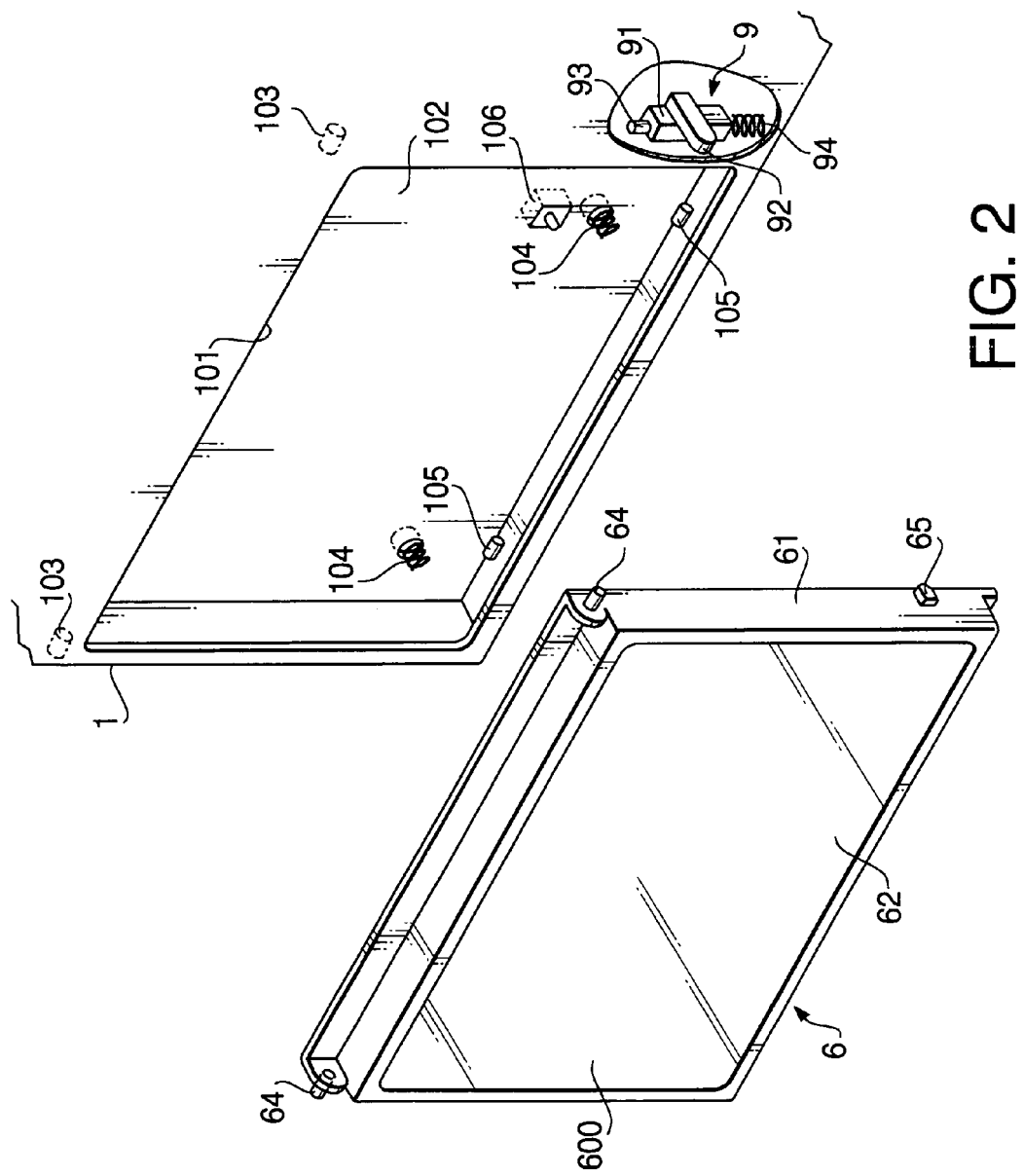
FIG. 2 shows a partially disassemblied view of a section that is related to the display device in accordance with the first exemplary embodiment of this invention.
Figure 3:
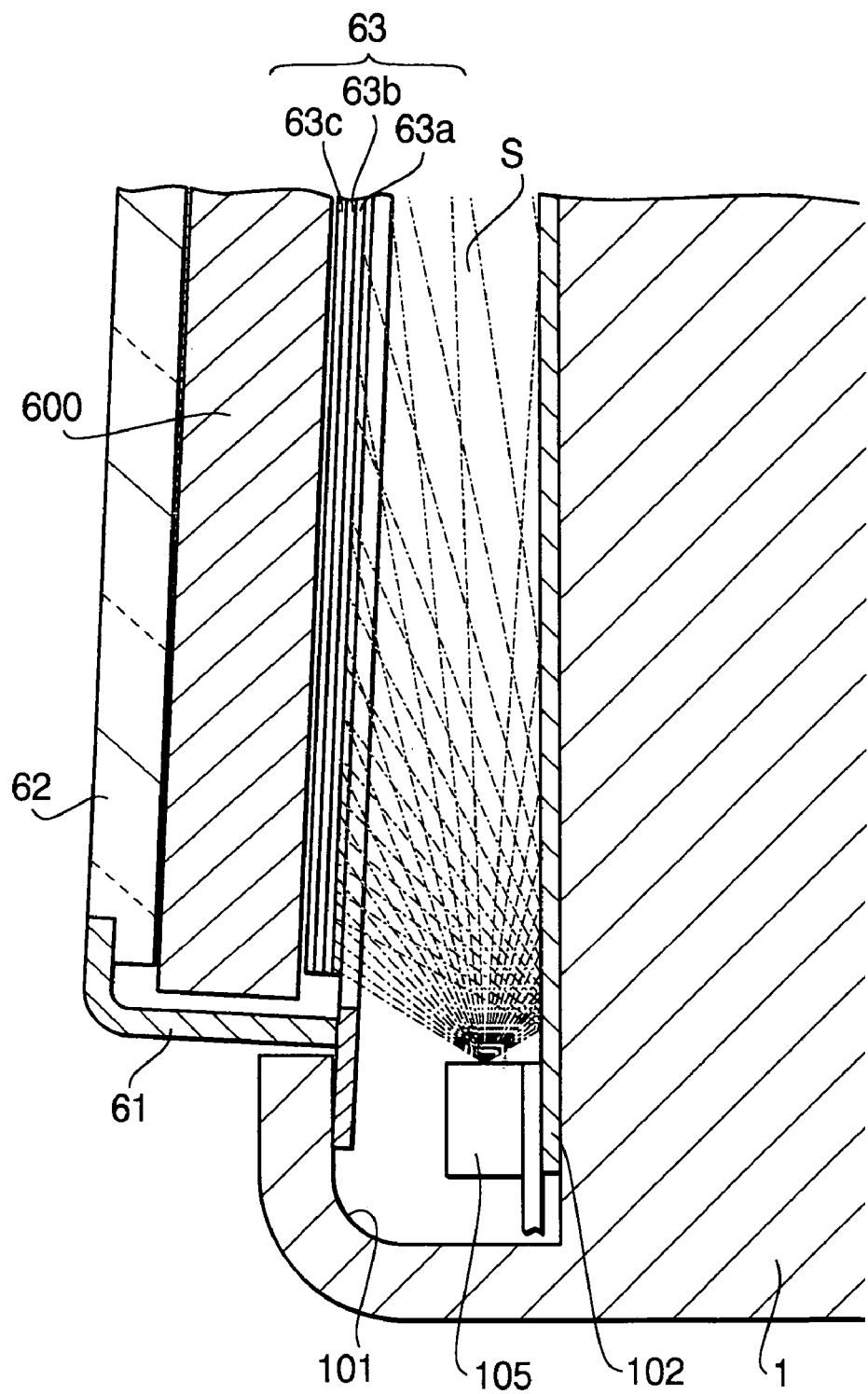
FIG. 3 shows an enlarged cross-sectional view of the display device, when an LCD is in a protruded position in accordance with the first exemplary embodiment of this invention.

FIG. 2 shows an enlarged view of the section that is related to the display 6. Further, FIG. 3 shows an enlarged cross-sectional view of the lower part of the LCD 600, when the LCD 600 is in the protruded position (as seen in FIG. 1B). The LCD 600 includes a piece of protective glass 62, which is arranged in a casing 61 and covers the front surface of the LCD 600, and is placed in an alcove 101 when it is not protruded. In addition, behind the LCD 600 is provided a diffuser panel 63 consisting of layers of a diffuser sheet 63a that diffuses beams and prism sheets 63b and 63c that refract beams in various directions. Furthermore, in the alcove 101 of the body 1, a thin reflector 102 with a surface being processed to reflect is provided on the surface that is opposed to the back of the LCD 600.

On each upper lateral edge of the casing 61 protrudes a support pin 64, and each support pin 64 is fit into a support hole 103. With this structure, the LCD 600 is enabled to rotatably protrude the lower part thereof outward from the plane of the body supported by the support pins 64. In addition, on the lower surface in the alcove 101 of the camera body 1, coiled LCD springs 104 are provided at two points, which come into contact with the lower part of the back of the LCD 600. The LCD springs 104 are arranged nearly perpendicularly to the rear side of the LCD 600 to provide expanding force to the lower part of the LCD 600.

A lever 9 described above is arranged on a position in the vicinity of a lower and lateral edge of the casing 61 on the surface of the body 1. The lever 9 includes a shaft 91, which is adapted to fluctuate inside the camera body 1, and a spring 94, which provides expanding force in the upper direction to the shaft 91. In addition, a lever handle 92, which protrudes outward from the surface of the camera body 1, is integrally provided to the lever 9. Further, on top of the shaft 91 is provided with a latch pin 93 protruding upward, which is adapted to engage with a sector protrusion 65, which is protruded at a lateral surface of the casing 61 of the LCD 600. The sector protrusion 65 is formed into a quarter sector with the circumferential surface facing downward, and is adapted to be in contact elastically with the latch pin 93.

It should be noted that two LEDs (light-emitted diodes) 105 are provided on the bottom surface of the alcove 101 arranged to emit beams upward. In addition, an LED power switch 106 is provided in the vicinity of one of the LCD springs 104, which switches electricity on and off to the LEDs 105. When the LCD 600 protrudes outward to the protruded position, the LED power switch 106 is released from the pressing force and the electricity is provided to the LEDs 105. When the LCD 600 is placed back to the retracted position and the LED power switch 106 is pressed by the rear side of the LCD 600, the electricity to the LEDs 105 is turned off. Also, an electric circuit (not shown) to connect electrically with the LED power switch 106 and the LEDs 105 is provided. These LEDs are adapted to serve as back lights for the LCD 600.

When the LCD 600 is not in use, or when there is enough available light to recognize the images shown on the LCD 600 with no illumination from the back lights, the lever 9 is not necessarily utilized. In this case, the LCD 600 remains in the retracted position and the front surface of the protective glass 62 of the LCD 600 is aligned with the surface of the camera body 1 to the plane surface, as shown in FIG. 1A and FIG. 4A. In this position, the protective glass 62 is not protruded outward, therefore, the depth of the camera body 1 can be maintained downsized, and the device can serve as a slim camera.

Alternatively, when the LCD 600 is in use and illumination from the back lights is required, the lever handle 92 of the lever 9 is pressed downward. FIG. 5A shows a cross-sectional view of the camera body 1 including the display 6 with the lever 9, which is in the retracted position. In this position, the latch pin 93 is in contact with the vertical edge of the sector protrusion 65 of the LCD 600 to latch the LCD 600. When the lever 9 is pressed down by a user, the shaft 91 is forced to move downward against the expansion force of the spring 94, which results in the latch pin 93 to be retracted downward and allows the sector protrusion 65 to be released (see FIG. 5B). Thus, the lower part of the LCD 600 is protruded outward by the expanding force of the LCD springs 104 to the protruded position, as shown in FIG. 5C, wherein the front surface of the LCD 600 is inclined in a small angle to the plane of the camera body 1. Also, FIG. 1B shows the LCD 600 in the same protruded position, and FIG. 4B shows a cross-sectional view thereof.

It should be noted that, with the LCD 600 in the protruded position as described above, a tapered open space S is formed between the diffuser panel 63 provided behind the LCD 600 and the reflector 102 attached to the alcove 101. Simultaneously, the LED power switch 106 is released from the pressing force by the LCD 600, which results in the LEDs 105 to be supplied with power to emit beams. The beams from the LEDs are emitted into the open space S between the diffuser panel 63 and the reflector 102. Some of the emitted beams are transmitted directly to the rear side of the LCD 600 to illuminate, while the other beams are reflected by the reflector 102, or reflected multiplicatively by the reflector 102 and the diffuser panel 63, and are eventually transmitted to the rear side of the LCD 600. When the beams are transmitted through the diffuser panel 63, wherein the beams are diffused by the diffuser sheet 63a and refracted by the prism sheets 63b and 63c, luminosity is distributed evenly to the entire rear side of the LCD 600. Thus, the LCD 600 is illuminated evenly from the rear side, and is enabled to display images with the illumination that functions as back lights known in the prior art, although without a light guide.

After the LCD 600 is used, the LCD 600 is moved back to the retracted position by being pressed at the lower surface of the protective glass 62 toward the camera body 1. When the LCD 600 is pressed back, as shown in FIGS. 5C, 5B, and 5A, the circumferential surface of the sector protrusion 65 and the latch pin 93 become in contact, and the shaft 91 is forced to move downward against the expansion force of the spring 94. Then, when the edge of the circumference surface is passed, the shaft 91 is allowed to move back by the expanding force of the spring 94, which results in the shaft 91 and the vertical edge of the sector protrusion 65 to become in contact and latched with each other. In this position, the front surface of the protective glass 62 of the LCD 600 is aligned with the surface of the camera body 1 to the plane surface, as shown in FIG. 4A. Simultaneously, the LED power switch 106 is pressed by the LCD 600 and stops supplying electricity to the LEDs 105.

In the present embodiment, as described above, no light guide is required between the camera body 1 and the LCD 600. Therefore, the depth of the display 6 including a lighting apparatus can be downsized, which results in a camera with a slim body to be achieved. In addition, by utilizing an open space formed behind the LCD 600, the entire LCD 600 is evenly illuminated from the rear side to the front surface, which enables a display including a highly transmissive LCD equipped with a lighting apparatus with high luminosity to be achieved.

Second Embodiment

FIG. 6 shows a partial view of a digital camera employing a display device in accordance with the second exemplary embodiment of the present invention. In the figures referred to in this embodiment, the same elements as those in the figures described above in the previous embodiment are marked with the same reference numbers. In the present embodiment, the surface of the LCD 600 is configured to protrude in parallel to the plane of the camera body 1, alternatively to the configuration of the previous embodiment, wherein the LCD 600 is rotatably protruded supported by the upper side. The other configuration in the vicinity of the lower side is the same as the configuration of the previous embodiment. It should be noted that on each upper lateral edge of the casing 62 of the LCD 600 protrudes outward a support pin 64a. Each support pin 64a is fit into a guide groove 107 that is formed in a corresponding position to each support pin 64 in an anteroposterior direction on the lateral surface of the alcove 101. With this structure, the upper part of the LCD 600 is enabled to move outward from the camera body 1 with the support pins 64a that slide along the guide grooves 107. When the display 6 is moved outward, the protective glass 62 together with the LCD 600 is protruded outward from the camera body 1. Further, on the upper surface of the alcove 101 of the camera body 1, coiled LCD springs 104 are provided at two points, which come into contact with the upper part of the back of the LCD 600, in addition to the LCD springs 104 provided at the lower two points. It should be noted that, similarly to the previous embodiment, two LEDs 105 are provided on the bottom surface of the alcove 101 arranged to emit beams upward. Furthermore, additional two LEDs 105 are provided on the top surface of the alcove 101 arranged to emit beams downward. The other configuration, including the sector protrusion 65 provided in the vicinity of the lower side of the LCD 600, the lever 9 provided on the camera body 1 correspondingly to the sector protrusion 65, and the LED power switch 106, are identical to the configuration of the previous embodiment.

According to an aspect of the present embodiment, when the LCD 600 is not in use, or when there is enough available light to recognize the images shown on the LCD 600 with no illumination from the back lights, the lever 9 is not necessarily utilized. In this case, the LCD 600 remains in the retracted position and the front surface of the protective glass 62 of the LCD 600 is aligned with the surface of the camera body 1 to the plane surface, as shown in FIG. 7A. In this position, the protective glass 62 is not protruded outward, therefore, the depth of the camera body 1 can be maintained downsized, and the device can serve as a slim camera.

Alternatively, when the LCD 600 is in use and illumination from the back lights is required, the lever handle 92 of the lever 9 is pressed downward. By this operation, the lower part of the LCD 600 is protruded outward by the expanding force of the LCD springs 104 to the protruded position, while the upper part of the LCD 600 is moved also outward with the support pins 64a that slide along the guide grooves 107. With this configuration, the entirety of the LCD 600 is pushed outward in parallel from the plane of the camera body 1, which results in to form an open and parallelized space between the back of the LCD 600 and the surface of the alcove 101.

When the LCD 600 is pushed outward, the LED power switch 106 is released from the pressing force, and the power is provided to the LEDs 105 to illuminate. The beams from the LEDs are emitted into the open space S from the bottom and the top surfaces of the alcove 101. FIG. 8 shows an enlarged cross-sectional view of the lower part of the LCD 600, when the beams are emitted from the LEDs on the bottom toward the open space S. Similarly to the previous embodiment described above, a diffuser panel 63 is provided behind the LCD 600. In addition, another diffuser panel 102a is provided in the alcove 101 facing to the rear side of the LCD 600. The diffuser panel 102a is provided fine and dense asperity to the surface, which is adapted to reflect the emitted beams multiplicatively together with the diffuser 63. This mechanism of diffusing the emitted beams is applied also to the LEDs on the top. Thus, the diffused beams are distributed evenly to the entire rear side of the LCD 600, and the LCD 600 is enabled to display images with the illumination that functions as back lights.

After the LCD 600 is used, the protective glass 62 of the display 6 is pressed toward the camera body 1 to the retracted position, wherein the sector protrusion 65 provided in the vicinity of the lower side of the LCD 600 and the latch pin 93 of the lever 9 become in contact and latched with each other. The upper part of the LCD 600 is moved toward the camera body 1 with the support pins 64a that slide along the guide grooves 107. In this position, the front surface of the protective glass 62 of the LCD 600 is aligned with the surface of the camera body 1 to the plane surface, as shown in FIG. 7A. Simultaneously, the LED power switch 106 is pressed by the LCD 600 and turns off the LEDs 105.

In the present embodiment, as described above, no light guide is required between a camera body 1 and the back of a transmissive LCD 600. Therefore, the depth of the display device including a lighting apparatus can be downsized, which results in a camera with a slim body to be achieved. In addition, by utilizing an open space formed behind the LCD 600, the entire LCD 600 is evenly illuminated from the rear side to the front surface, which enables a display device including a highly transmissive LCD equipped with back lights with high luminosity. Particularly in the present embodiment, forming an open space by moving the LCD 600 in parallel to the camera body 1 enables to provide additional LEDs 105 to the top surface of the alcove 101 in addition to the bottom surface. With these LEDs, the LCD 600 is provided higher luminosity to display the images than the LCD 600 in the first embodiment.

Third Embodiment

According to an aspect of the third exemplary embodiment, a display configured with a reflective LCD is employed as a display device of a digital camera. In a reflective LCD, the surface of the display area needs to be illuminated to obtain recognizable images using an lighting apparatus (i.e., front light). FIG. 9 shows a cross-sectional and partial view of the display 6 configured with a reflective LCD 601 in accordance with the third exemplary embodiment of the present invention. In this embodiment, the reflective LCD 601 is fixed in the alcove 101 of the camera body 1 as that the front surface of the LCD 601 is recessed from the plane surface of the camera body 1. Further, the display 6 is provided with a piece of protective glass 62 in front of the LCD 601 with a narrow space formed between the protective glass 62 and the LCD 601. The protective glass 62 is framed in a casing 61, which is provided with a support pin 64 on each upper lateral edge, similarly to the first embodiment (see FIG. 2). With this structure, the protective glass 62 is enabled to rotatably protrude the lower part thereof outward from the camera body 1. In addition, also similarly to the first embodiment, a sector protrusion (not shown) is provided at a lateral surface of the casing 61, and a lever (not shown) for latching and releasing the LCD 601 configured similarly to the lever 9 in the first embodiment is also provided on the surface of the camera body 1.

Furthermore, on the lower surface in the alcove 101 of the camera body 1, coiled springs (not shown) to provide expanding force to the protective glass 62 are arranged at two points, which come into contact with the lower sides of the casing 61. With the expanding force from the coiled springs, the lower part of the protective glass 62 is protruded outward from the LCD 601. In addition, an LED power switch (not shown) is provided in the vicinity of one of the coiled springs, which switches electric power supply on and off to the LEDs when the LCD 601 protrudes outward to the protruded position and when the LCD 601 is pushed back to the retracted position. Also, at least one LED is provided on the lower edge of the casing 61 arranged to emit beams upward.

When the LCD 601 is not in use, or when there is enough available light to recognize the images shown on the LCD 601 with no illumination from the back lights, the lever is not necessarily utilized. In this case, the protective glass 62 remains in the retracted position and the front surface of the protective glass 62 is aligned with the surface of the camera body 1 to the plane surface, as shown in FIG. 10A.

Alternatively, when the LCD 601 is in use and illumination from the back lights is required, the lever handle of the lever is pressed downward and the casing 61 with the protective glass 62 is released. By this operation, the lower part of the protective glass 62 is protruded outward from the surface of the camera body 1 to the protruded position. With the protective glass 62 is in the protruded position, the narrow space is enlarged to a tapered open space S formed between the protective glass 62 and the LCD 601, as shown in FIG. 10B. Simultaneously, the LED power switch is released from the pressing force of the protective glass 62, which results in the LEDs 105 to be provided with power to emit beams.

The beams from the LEDs 105 are emitted into the enlarged space S between the protective glass 62 and the front surface of the LCD 601. Some of the emitted beams are transmitted directly to the rear side of the LCD 600 to illuminate, while the other beams are reflected by the reflector 102, or reflected multiplicatively by the rear side of the protective glass 62 and the front surface of the LCD 601, and are eventually transmitted to the surface of the LCD 601. Then, luminosity is distributed evenly to the entire front surface of the LCD 601. Thus, the LCD 601 is illuminated evenly from the front, and is enabled to display images with the illumination that functions as front lights without a light guide.

After the LCD 601 is used, the LCD 601 is moved back to the retracted position by being pressed at the lower surface of the protective glass 62 toward the camera body 1. When the LCD 601 is pressed back, as shown in FIG. 10A, the front surface of the protective glass 62 of the LCD 601 is aligned with the surface of the camera body 1 to the plane surface. Simultaneously, the LED power switch is pressed by the casing 61 and stops supplying electricity to the LEDs 105.

In the present embodiment, as described above, no light guide is required in front of the reflective LCD 601. Particularly in the present embodiment, the beams are transmitted by utilizing the reflection on the rear side of the protective glass 62, alternatively to guiding external luminosity into the inside of the protective glass 62. With this mechanism, the beams may be reflected by even thinner protective glass, which may be effective to achieve a downsized configuration for a camera. In addition, by utilizing an open space formed in front of the LCD 601, the entire LCD 601 is evenly illuminated, which enables a display device including a highly reflective LCD equipped with a lighting apparatus with high luminosity to be achieved.

It should be noted that the protective glass 62 in the present embodiment might be configured to protrude in parallel to the front surface of the LCD 601, similarly to the second embodiment. In this configuration, additional LEDs may be arranged on the top surface of the alcove 101 as well as the bottom surface, to illuminate the LCD 601. With these LEDs, the LCD 601 may be provided higher and evenly distributed luminosity to display the images.

Although examples of carrying out the invention have been described, those skilled in the art will appreciate that there are numerous variations and permutations of the above described devices other than a camera that fall within the spirit and scope of the invention as set forth in the appended claims, such as a cellular phone and other electrical devices equipped with LCDs and required to be downsized in depth. It is to be understood that the subject matter defined in the appended claims is not necessarily limited to the specific features or act described above. Rather, the specific features and acts described above are disclosed as example forms of implementing the claims.

The present disclosure relates to the subject matter contained in Japanese Patent Application No. 2004-243252, filed on Aug. 24, 2004, which is expressly incorporated herein by reference in its entirety.

What is claimed is:

1. A display device provided to a body of a predetermined device, comprising:
 a transmissive liquid crystal display configured to be movable with respect to the body between a retracted position and a protruded position, an outer surface of the liquid crystal display being substantially in a same plane of a surface of the body on which the liquid crystal display is provided when the liquid crystal display is located at the retracted position, the outer surface of the liquid crystal display being protruded from the plane of the body when the liquid crystal display is located at the protruded position, an open space being formed on an inner side of the liquid crystal display; and
 at least one light source configured to emit light toward the open space to illuminate the liquid crystal display located at the protruded position from a rear side thereof.

2. The display device according to claim 1,
 wherein the liquid crystal display is rotatably supported at one side end thereof, so that an opposite end portion of the liquid crystal display is protrusible outward from the device body; and
 wherein the at least one light source is provided at an edge corresponding to the opposite end portion of the liquid crystal display.

3. The display device according to claim 1,
 wherein the entirety of the liquid crystal display is configured to protrude outward from the device body; and
 wherein the at least one light source includes a plurality of light sources that are arranged along two edges corresponding to the sides of the liquid crystal display that are parallel to each other.

4. The display device according to claim 1,
 comprising a reflector that is adapted to reflect beams on a surface of the device body facing the rear side of the liquid crystal display.

5. The display device according to claim 1,
 comprising a diffusing system that is adapted to diffuse beams on the rear side of the liquid crystal display.

6. The display device according to claim 1, comprising
 a switching system that is configured to switch electric power supply to the at least one light source so that the light source is turned on when the liquid crystal display is in the protruded position and turned off when the liquid crystal display is in the retracted position.

7. The display device according to claim 1, comprising:
 a latching system that is configured to latch the liquid crystal display in the retracted position in the device body and release the liquid crystal display in a manual operation; and
 a bias member that is configured to allow the liquid crystal display to expand outward from the device body.

8. A digital camera with a display device, comprising:
 a transmissive liquid crystal display configured to be movable with respect to the camera body between a retracted position and a protruded position, an outer surface of the liquid crystal display being substantially in a same plane of a surface of the camera body on which the liquid crystal display is provided when the liquid crystal display is located at the retracted position, the outer surface of the liquid crystal display being protruded from the plane of the camera body when the liquid crystal display is located at the protruded position, an open space being formed on an inner side of the liquid crystal display; and
 at least one light source configured to emit light toward the open space to illuminate the liquid crystal display located at the protruded position from a rear side thereof.

9. A lighting apparatus provided to a body of a predetermined device, comprising:
 at least one light source configured to emit light toward an open space to illuminate an object from a rear side thereof, the object being adapted to be movable with respect to the body between a retracted position and a protruded position, an outer surface of the object being substantially in a same plane of a surface of the body on which the object is provided when the object is located at the retracted position, the outer surface of the object being protruded from the plane of the body when the object is located at the protruded position, the open space being formed on an inner side of the object.

* * * * *